United States Patent
Miyajima

(10) Patent No.: US 10,129,909 B2
(45) Date of Patent: Nov. 13, 2018

(54) WIRELESS COMMUNICATION SYSTEM AND WIRELESS COMMUNICATION METHOD

(71) Applicant: DENSO WAVE INCORPORATED, Chita-gun (JP)

(72) Inventor: Takahiro Miyajima, Chita-gun (JP)

(73) Assignee: DENSO WAVE INCORPORATED, Chita-Gun (JP)

( * ) Notice: Subject to any disclaimer, the term of this patent is extended or adjusted under 35 U.S.C. 154(b) by 14 days.

(21) Appl. No.: 15/643,670

(22) Filed: Jul. 7, 2017

(65) Prior Publication Data

US 2018/0020482 A1 Jan. 18, 2018

(30) Foreign Application Priority Data

Jul. 15, 2016 (JP) .................................. 2016-139858

(51) Int. Cl.
| | |
|---|---|
| H04W 74/08 | (2009.01) |
| F24F 11/62 | (2018.01) |
| F24F 11/30 | (2018.01) |
| H04W 52/28 | (2009.01) |
| H04W 74/00 | (2009.01) |

(Continued)

(52) U.S. Cl.
CPC ......... *H04W 74/0816* (2013.01); *F24F 11/30* (2018.01); *F24F 11/62* (2018.01); *G08C 17/02* (2013.01); *H04W 52/28* (2013.01); *H04W 74/006* (2013.01); *F24F 11/56* (2018.01); *F24F 11/65* (2018.01); *G08C 2201/40* (2013.01);

(Continued)

(58) Field of Classification Search
CPC ................................................. H04W 74/0816
See application file for complete search history.

(56) References Cited

U.S. PATENT DOCUMENTS

| | | | | |
|---|---|---|---|---|
| 2007/0014268 A1* | 1/2007 | Kim | .................. | H04W 74/0816 370/338 |
| 2013/0051358 A1* | 2/2013 | Turtinen | ........... | H04W 74/0816 370/330 |

(Continued)

FOREIGN PATENT DOCUMENTS

JP 2004-003837 1/2004

*Primary Examiner* — Hoon J Chung
(74) *Attorney, Agent, or Firm* — IP & T Group LLP

(57) ABSTRACT

A wireless communication system performing wireless communication in carrier sense multiple access/collision avoidance system is provided. The wireless communication system includes: remote controllers that corresponding to control targets and transmitting control information for controlling each of the control targets through wireless communication; and an access point that receives and relays the control information to a control apparatus of the control target. The access point includes an access point side wireless communication control portion transmitting a beacon signal and performing wireless communication with each of the remote controllers. Each of the remote controllers includes a remote controller side wireless communication control portion performing wireless communication with the access point. The remote controller side wireless communication control portion performs a carrier sense for a predetermined carrier sense period. The remote controller side wireless communication control portion transmits the control information, and shortens the carrier sense period for a next carrier sense.

7 Claims, 13 Drawing Sheets

(51) Int. Cl.
*G08C 17/02* (2006.01)
*F24F 11/65* (2018.01)
*F24F 11/56* (2018.01)

(52) U.S. Cl.
CPC ....... G08C 2201/42 (2013.01); *H04W 52/287* (2013.01)

(56) References Cited

U.S. PATENT DOCUMENTS

2015/0215867 A1* 7/2015 Choi ................... H04W 48/14 370/311
2017/0111890 A1* 4/2017 Matsuo ................ H04L 5/0048

\* cited by examiner

⟨EXAMPLE OF SETTING OF CARRIER SENSE PERIOD⟩

| NUMBER n | TRANSMISSION TIMES CN[n] (RELATIVE VALUE) | COMMUNICATION RATIO K[n] | CARRIER SENSE PERIOD Tcs[n] |
|---|---|---|---|
| 1 | 10 | $\frac{10}{16}$ | $\frac{6}{16}$Tb |
| 2 | 5 | $\frac{5}{16}$ | $\frac{11}{16}$Tb |
| 3 | 1 | $\frac{1}{16}$ | $\frac{15}{16}$Tb |

FIG. 14
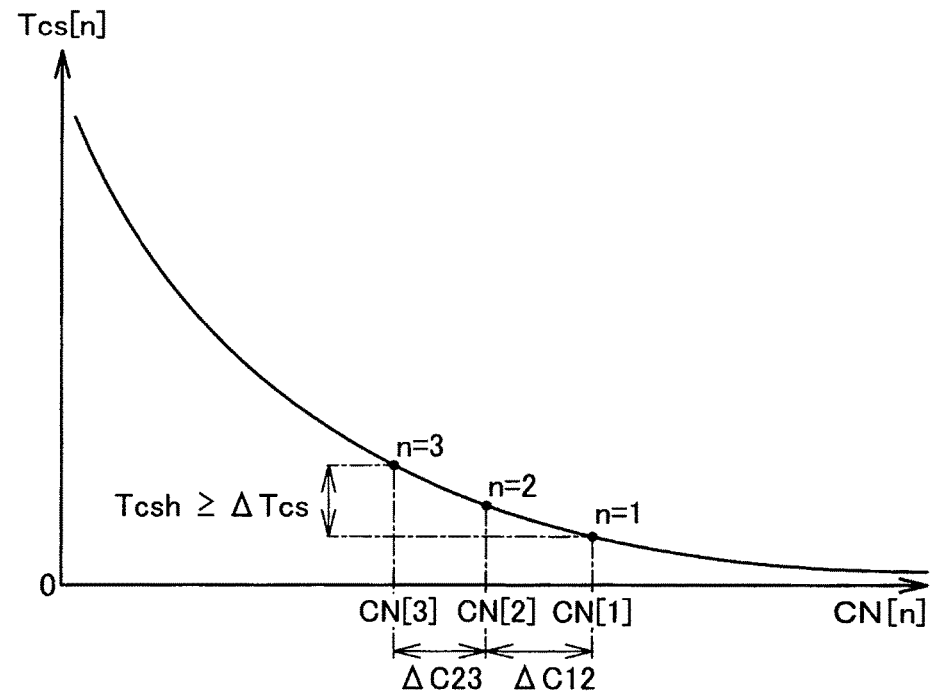
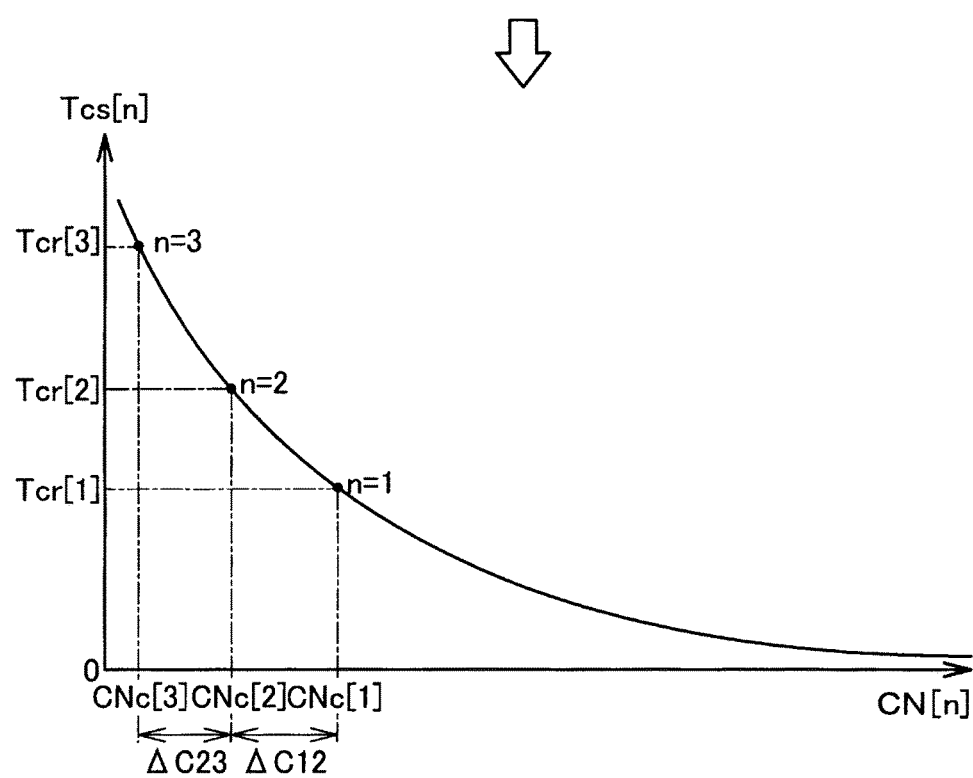

WIRELESS COMMUNICATION SYSTEM AND WIRELESS COMMUNICATION METHOD

CROSS REFERENCE TO RELATED APPLICATIONS

This application is based on Japanese Patent Application No. 2016-139858 filed on Jul. 15, 2016, the disclosure of which is incorporated herein by reference.

TECHNICAL FIELD

The present disclosure relates to a wireless communication system and a wireless communication method.

BACKGROUND

Patent literature 1: JP 2004-003837 A

Conventionally, in order to perform air conditioning in multiple rooms, an air conditioning apparatus including a single air conditioning unit with a heat exchanger and a fan or the like is used. In this case, a duct is arranged from the single air conditioning unit to each room, and the air conditioning apparatus feeds to each room, air exhausted from the air conditioning unit. For example, an air conditioning apparatus controls an opening of a damper provided to a blowout part of each room in accordance with information outputted from a wireless remote controller (also referred to as a remote controller) placed to each room, so that temperature of each room is adjusted (referring to patent literature 1). In this case, in the air conditioning apparatus, the remote controller pre-associated with each room wirelessly communicates with an access point. A control apparatus of the air conditioning unit can perform, in accordance with the received information through the access point, an adjustment of temperature of a room corresponding to the remote controller, which has outputted the information.

Incidentally, when the wireless communication is performed between multiple remote controllers and the access point, in general, a carrier sense multiple access/collision avoidance (CSMA/CA) is used, and the communication is controlled in order to prevent a collision of transmissions from multiple remote controllers.

SUMMARY

Power consumption (that is, electric power consumption) of each remote controller is different in the time of setting operation, such as temperature setting, an air volume setting or the like, and non-operation state. Therefore, a remote controller with higher operation frequency has more power consumption (that is, consumes larger power), and a battery life shortens. When the operation frequencies of remote controllers have deviation, in accordance with the deviation, battery lives of the remote controllers may greatly deviate. The deviation of the battery lives of remote controllers may cause distribution of battery exchange timing, may cause complication of a battery exchange management for a user, and may provide a burden to the user. Therefore, it may be preferable that the difference of battery lives of remote controllers is as small as possible, and it may be preferable that useless power consumption is controlled as much as possible, especially for a remote controller with high operation frequency.

Incidentally, the above described difficulty is not limited to an air conditioning apparatus. This difficulty may be in common with a system which controls a control target providing each service to multiple areas by using multiple remote controllers associated with the multiple areas.

It is an object of the present disclosure to provide a wireless communication system and a wireless communication method capable of suppressing electric consumption of remote controllers having a high operation frequency and reducing the difference to battery lives of the remote controllers.

According to one aspect of the present disclosure, a wireless communication system performing wireless communication in carrier sense multiple access/collision avoidance system is provided. The wireless communication system includes: multiple remote controllers that corresponding to multiple control targets and transmitting control information for controlling each of the control targets through wireless communication, each of the remote controllers having a battery as power source, and an access point that receives and relays the control information to a control apparatus of the control target. The access point includes an access point side wireless communication control portion transmitting a beacon signal at a particular cycle and performing wireless communication with each of the remote controllers, the beacon signal having communication condition information. Each of the remote controllers includes a remote controller side wireless communication control portion performing wireless communication with the access point in accordance with the communication condition information, which is included in the beacon signal received. The remote controller side wireless communication control portion performs a carrier sense for a predetermined carrier sense period after receiving the beacon signal. When determining that transmission of the control information by one of the remote controllers is available by the carrier sense, the remote controller side wireless communication control portion transmits the control information, and the remote controller side wireless communication control portion shortens the carrier sense period for a next carrier sense in accordance with number of times of transmission of the control information.

According to the wireless communication system, the carrier sense period is shortened in accordance with increase of the number of times of transmission of control information, and thereby it may be possible to increase transmission possibility of a remote controller as the power consumption increases in accordance with the increase of the number of times of transmission of the control information. Therefore, it may be possible to suppress the power consumption of a remote controller with high operation frequency, and it may be possible to reduce a difference of battery lives of remote controllers.

According to another aspect of the present disclosure, a wireless communication method performing wireless communication in carrier sense multiple access/collision avoidance system between multiple remote controllers and an access points is provided. The multiple remote controllers correspond to multiple control targets and transmit control information for controlling each of the control targets through wireless communication. Each of the remote controllers has a battery as power source. The access point receives and relays the control information to a control apparatus of the control target. The wireless communication method includes: performing in the access point, by transmitting a beacon signal at a particular cycle, wireless communication with each of the remote controllers, the beacon signal having communication condition information; and performing wireless communication with the access point in accordance with the communication condition information, which is included in the beacon signal received. The performing the wireless communication with the access point includes: performing a carrier sense for a predetermined carrier sense period after receiving the beacon signal; and shortening, when determining that transmission is available by the carrier sense, after transmitting the control information, the carrier sense period for a next carrier sense in accordance with number of times of transmission of the control information.

According to the wireless communication method, the carrier sense period is shortened in accordance with increase of times of transmission of the control information, and it may be possible to increase transmission possibility as the power consumption increases in accordance with the increase of times of transmission of the control information. Therefore, it may be possible to suppress the power consumption of a remote controller having a high operation frequency, and it may be possible to reduce a difference of battery lives of remote controllers.

BRIEF DESCRIPTION OF THE DRAWINGS

The above and other objects, features and advantages of the present disclosure will become more apparent from the following detailed description made with reference to the accompanying drawings. In the drawings:

FIG. 14 is a diagram illustrating an example of calibration of a carrier sense period.

DETAILED DESCRIPTION

Figure 1:
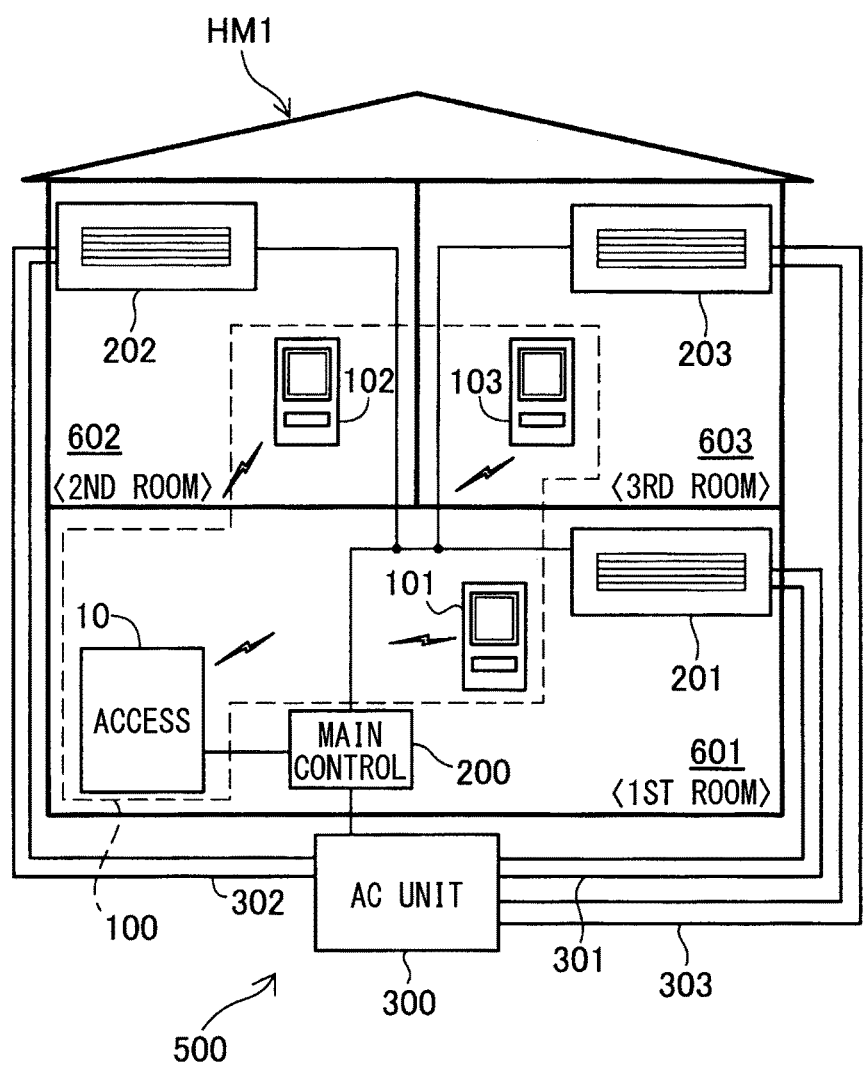
FIG. 1 is a diagram illustrating a configuration of an air conditioning system to which a wireless communication system as a first embodiment is applied.

FIG. 1 is a diagram explaining a configuration of an air conditioning system to which a wireless communication system as a first embodiment is applied. The air conditioning system 500 is installed in a building HM1, and performs the air conditioning in three rooms: a first room 601, a second room 602 and a third room 603 in the building HM1.

The air conditioning system 500 includes an air conditioning unit 300, three blowout units 201, 202, 203, three ducts 301, 302, 303, a main control apparatus 200, and a wireless communication system 100. In the present embodiment, each of the air conditioning unit 300, the three blowout units 201, 202, 203, the three ducts 301, 302, 303, and the main control apparatus 200 corresponds to a control target by the wireless communication system 100, providing an air conditioning service to each of the rooms 601, 602, 603.

The air conditioning unit 300 has a heat exchanger, a fan, a compressor, or the like, which are not illustrated, and generates and supplies warm or cold air. In the present embodiment, the air conditioning unit 300 is placed outside the building HM1, that is, outdoor position.

The first blowout unit 201 is placed in the first room 601. The second blowout unit 202 is placed in the second room 602. The third blowout unit 203 is placed in the third room 603. The first blowout unit 201 is connected with the air conditioning unit 300 through the first duct 301. The second blowout unit 202 is connected with the air conditioning unit 300 through the second duct 302. The third blowout unit 203 is connected with the air conditioning unit 300 through the third duct 303. Incidentally, the three blowout units 201, 202, 203 are placed to a ceiling, a wall surface along a vertical direction, or a floor, for example. The three blowout units 201, 202, 203 have similar configurations each other. Specifically, each of the three blowout units 201, 202, 203 has a blowout port, a damper, and louver, which are not illustrated, adjusts the air volume and direction of warm air or cold air supplied from the air conditioning unit 300 through each of the ducts 301, 302, 303 and supplies (exhausts) them to each of the room 601, 602, 603.

The wireless communication system 100 has an access point 10. The main control apparatus 200 is electrically connected with each of the air conditioning unit 300, the three blowout units 201, 202, 203, and the access point 10. The main control apparatus 200 controls the air conditioning unit 300 and the three blowout units 201, 202, 203, based on control information received from the access point 10 of the wireless communication system 100. Specifically, for example, when the main control apparatus 200 receives the control information indicating temperature increase from the access point 10 of the wireless communication system 100, the main control apparatus 200 controls the air conditioning unit 300 to exhaust a warmer air, and controls a blowout unit of the designated room to enlarge the opening of the damper. The main control apparatus 200 corresponds to a control apparatus of the control target (including the air conditioning unit 300, the blowout units 201, 202, 203). Incidentally, the control information received from the access point 10 of the wireless communication system 100 includes an area identifier (area ID) indicating each of the rooms 601, 602, 603. The main control apparatus 200 controls the blowout unit corresponding to the area ID.

The wireless communication system 100 has three remote controllers 101, 102, 103, and the access point 10. In the first room 601, the first remote controller 101 is used in order to control the air volume, direction, temperature or the like of the air exhausted from the first blowout unit 201. In the second room 602, the second remote controller 102 is used in order to control the air volume, direction, temperature or the like of the air exhausted from the second blowout unit 202. In the third room 603, the third remote controller 103 is used in order to control the air volume, direction, temperature or the like of the air exhausted from the third blowout unit 203. The three remote controllers 101, 102, 103 have similar configurations each other, and can operate with a battery as a power source, and can perform wireless communication with the access point 10. Incidentally, in this application, the phrase "power" represents electric power in general.

Figure 2:
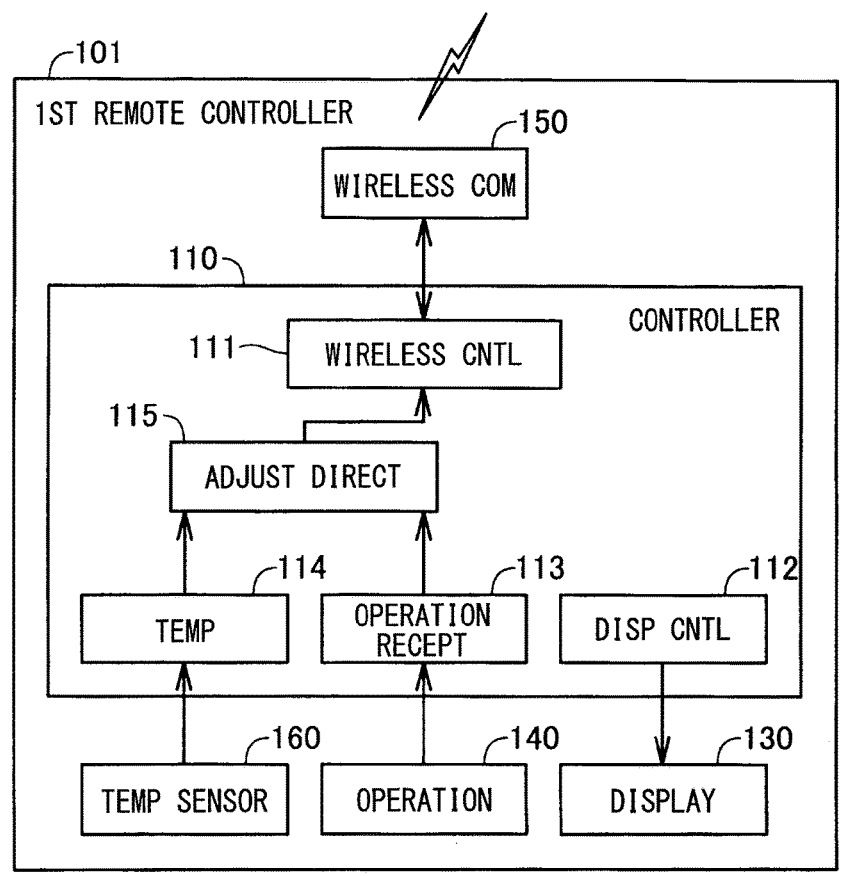
FIG. 2 is a block diagram illustrating a configuration of a first remote controller illustrated in FIG. 1.

FIG. 2 is a block diagram illustrating a configuration of the first remote controller 101 illustrated in FIG. 1. The first remote controller 101 has a control portion 110, an indicator 130, an operation portion 140, a wireless communication portion 150 and a temperature sensor 160. The first remote controller 101 includes a battery, which is not illustrated, and supplies power with each functional portion 110, 130, 140, 150, 160 from the battery.

The control portion 110 is configured from a computer such as a microcomputer, including a CPU, a memory, an input/output interface, or the like. The control portion 110 executes a control program stored in the memory, and functions as a wireless communication control portion 111, a display control portion 112, an operation reception portion 113, a temperature acquisition portion 114, and an adjustment direction portion 115.

The wireless communication control portion 111 controls the wireless communication portion 150, and executes the wireless communication to the access point 10. The wireless communication uses a carrier wave of the frequency of a 2.4 GHz bandwidth in the present embodiment, for example. The communication system of the wireless communication may be any communication system which has been standardized such as wireless PAN (Personal Area-Network) specified by IEEE802.15.4, various wireless LAN (Local Area Network) specified by IEEE802.11. Furthermore, any communication system which is not standardized may be used. The communication system of the wireless communication may be another type of wireless communication system using a wireless signal having any frequency, not only 2.4 GHz.

The operation reception portion 113 receives various setting values, selection of menu, or the like inputted by a user through operation of the operation portion 140. The operation portion 140 can be configured by a push button, for example. Instead of a push button, the operation portion 140 may be configured by a touch panel or the like.

The display control portion 112 displays various setting information such as air volume, temperature, a wind direction received from the operation portion 140, a temperature detected by the temperature sensor 160, various menu screens on the display portion 130. The display portion 130 can be configured by, for example, a liquid crystal panel. The display portion 130 can be configured by various flat panels, not only the liquid crystal panel.

The temperature acquisition portion 114 acquires temperature detected by the temperature sensor 160. Incidentally, the temperature detected by the temperature sensor 160 is used in an air conditioning control by the main control apparatus 200 or the like as temperature representative of the first room 601.

The adjustment direction portion 115 transmits (outputs) to the access point 10 through the wireless communication portion 150 in accordance with the control by the wireless communication control portion 111, the various setting values inputted by the operation portion 140 and the temperature value acquired by the temperature sensor 160 as control information for controlling the control target (the air conditioning unit 300, the blowout units 201, 202, 203).

The configurations of the second remote controller 102 and the third remote controller 103 have the same configuration as the configuration of the first remote controller 101. Thus, the detailed explanation will be omitted.

As illustrated in FIG. 1, the access point 10 is connected by wire to the main control apparatus 200. In addition, the access point 10 is wirelessly connected to each of the remote controllers 101, 102, 103. The access point 10 relays to the main control apparatus 200, the control information outputted from each of the remote controllers 101, 102, 103. Incidentally, in the access point 10, the maximum number of connectable remote controllers is determined in advance. In the present embodiment, the maximum number is set as sixteen.

Figure 3:
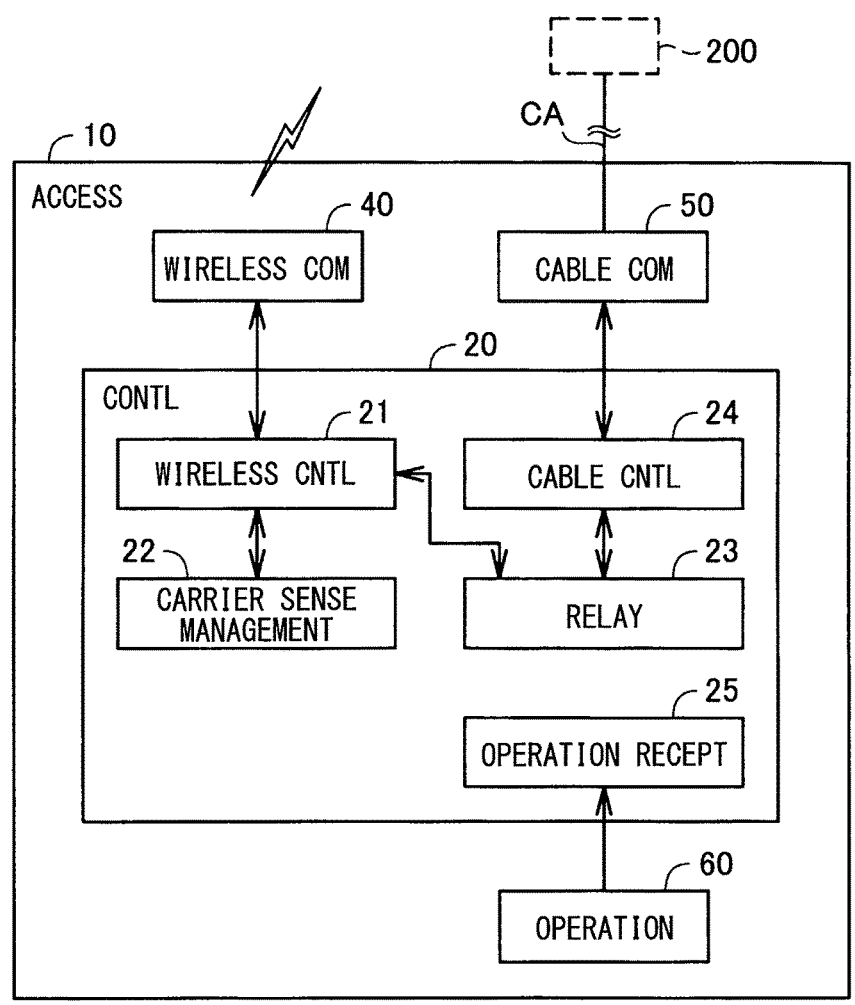
FIG. 3 is a block diagram illustrating a configuration of an access point illustrated in FIG. 1.

FIG. 3 is a block diagram illustrating a configuration of an access point 10 illustrated in FIG. 1. The access point 10 has a control portion 20, a wireless communication portion 40, a cable communication portion 50, and an operation portion 60.

The control portion 20 is configured from a computer such as a microcomputer, including a CPU, a memory, an input/output interface, or the like, which are not illustrated. The control portion 20 executes an access point control program stored in the memory, and functions as a wireless communication control portion 21, a carrier sense management portion 22, a relay portion 23, a cable communication control portion 24, and an operation reception portion 25.

The wireless communication control portion 21 controls the wireless communication portion 40, and performs the wireless communication to each of the remote controllers 101, 102, 103. The cable communication control portion 24 controls the cable communication portion 50, and performs a cable communication (also referred to as wired communication) with the main control apparatus 200 through a cable CA. A communication system between the main control apparatus 200 and the cable communication control portion 24 may be any standardized communication system such as a communication system of various LAN (local area network) specified by IEEE802.3, a serial bus communication including USB (universal serial bus), and also may be any communication system which is not standardized.

The carrier sense management portion 22 manages a carrier sense period. The carrier sense period corresponds to the length of the period (referred to as a carrier sense period) of the career sense performed in each of the remote controllers 101, 102, 103. The relay part 23 relays the control information received from each of the remote controllers 101, 102, 103 to the main control apparatus 200 through the cable communication control portion 24 and the cable communication portion 50. Incidentally, in the present embodiment, "to relay the control information" represents "to transmit the received control information".

A user operates the operation portion 60 and inputs various setting values. The operation reception portion 25 receives the various setting values for controlling the access point 10. The operation portion 60 can be configured by a push button, for example. Instead of a push button, the operation portion 60 may be configured by a touch panel or the like.

Figure 4:
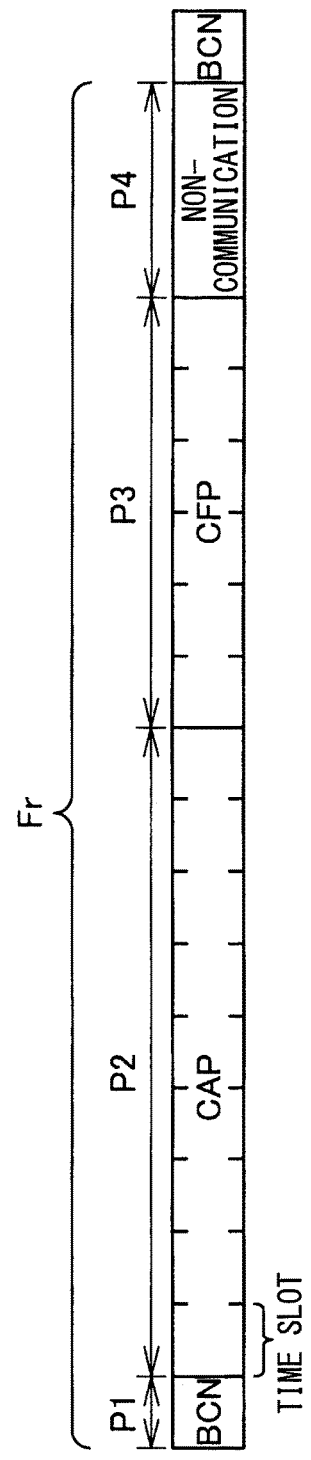
FIG. 4 is a diagram illustrating a frame structure of wireless communication between the access point and each remote controller.

FIG. 4 is a diagram illustrating a frame structure of wireless communication between the access point and each of the remote controllers 101, 102, 103. A communication unit is specified by a time slot determined by a particular period of time. A frame Fr includes a beacon (BCN) period P1 placed at the head, a contention access period (CAP) P2, a contention free period (CFP, also referred to as a non-contention access period) P3, and a non-communication period P4. Incidentally, the order of the contention access period P2 and the contention free period P3 can be reversed. The non-communication period P4 may be omitted. FIG. 4 illustrates an example in which the length of the beacon period P1 is set to one slot, the length of the contention access period P2 is set to nine slots, and the length of the contention free period P3 is set to six slots.

In the beacon period P1, the access point 10 transmits a beacon signal every particular frame period, and synchronization between the access point 10 and each of the remote controller 101, 102, 103 is achieved. The beacon signal includes various information, such as communication condition information including structure information of the frame Fr. Each of the remote controllers 101, 102, 103 determines, based on the structure information in the beacon signal, the position and the length of the contention access period P2, the contention free period P3, and the non-communication period P4 in the frame Fr, and performs the wireless communication with the access points 10 in accordance with the determination.

In the contention access period P2, each of the remote controllers 101, 102, 103 can freely perform synchronized wireless communication with the access point 10 in accordance with a procedure of CSMA/CA. It is supposed that the user operates the operation portion 140 of any one of the remote controllers and inputs various setting information. In this case, the various setting information is transmitted to the access point 10 in wireless communication in a case where other remote controllers does not perform wireless communication.

In the contention free period P3, wireless commutation by a particular remote controller of the remote controllers 101, 102, 103 is assured. Thus, the permitted particular remote controller can perform transmission and reception of information by wireless communication regularly performed in accordance with predetermined communication protocol at a permitted timing. Incidentally, the access point 10 can determine whether each of the remote controllers 101, 102, 103 normally operates by performing transmission and reception of information between each of the remote controllers 101, 102, 103 in the contention free period P3.

Figure 5:
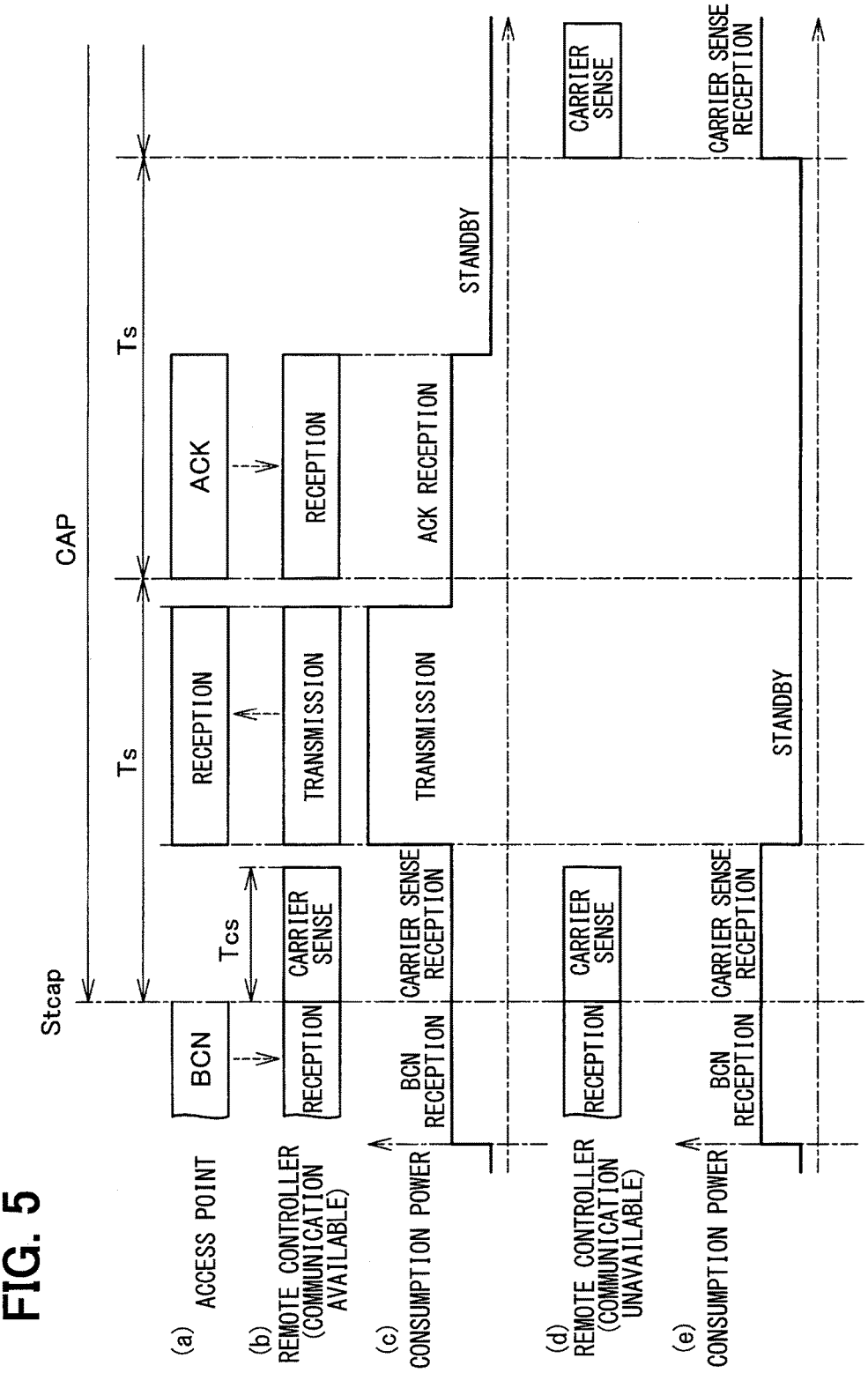
FIG. 5 is a diagram illustrating a basic operation in the wireless communication in which a remote controller executes to transmit control information in a contention access period.

FIG. 5 is a diagram illustrating a basic operation in the wireless communication in which a remote controller executes to transmit the control information in the contention access period P2. In the beacon (BCN) period, the access point 10 transmits the beacon signal, as mentioned above ((a) part of FIG. 5). In the beacon period, all remote controllers change from a standby mode to a beacon reception mode, and receive the beacon signal ((b) and (d) parts of FIG. 5). In this case, the power consumption of the remote controller increases from a beacon reception power to a beacon reception power ((c) and (e) parts of FIG. 5). Incidentally, the beacon reception power is illustrated as a fixed value for convenience of illustration and explanation. The beacon reception power may change according to a reception level of the signal.

At a start timing Stcap of the contention access period P2 (CAP) when the beacon period P1 terminates, a remote controller having the control information to be transmitted performs a carrier sense during the carrier sense period Tcs that is determined ((b) and (d) parts of FIG. 5). Specifically, the remote controller having the control information to be transmitted determines whether communication (hereinafter, also referred to as a wireless communication at communication frequency) at a carrier frequency for transmitting the control information is permitted, based on whether a signal of the carrier frequency is received. In this case, the power consumption of the remote controller ((c) and (e) parts of FIG. 5) becomes a carrier sense power, which is greater than the standby power. The carrier reception power may also change in accordance with the reception level of the signal, as similar to the beacon reception power. For convenience of explanation, a state of the remote controller in the beacon period P1 is defined as the carrier sense reception mode, and a state of the remote controller in the carrier sense period is defined as the beacon reception mode. It should be noticed that these states (that is, the carrier sense reception mode and the beacon reception mode) corresponds to a reception mode that receives a signal having a carrier frequency.

The remote controller that has determined that the wireless communication at the communication frequency is possible (communication available) changes to a transmission mode ((b) part of FIG. 5), and transmits the control information, and the access point 10 receives the transmitted control information ((a) part of FIG. 5). In this case, the power consumption of the remote controller increases from the carrier power to a transmission power. The remote controller which has terminated the transmission of the control information shifts to a response (ACK) reception mode, and waits for the response from the access point 10. When the response signal is transmitted from the access point 10 at the following time slot TS, the remote controller receives the response signal. In this case, the power consumption of the remote controller becomes a response reception power. The response reception power may change in accordance with the reception level, as similar to the beacon reception power and the carrier reception power. Incidentally, the beacon reception power, the carrier sense reception power, and the response reception power may be identical each other. The remote controller after receiving the response signal shifts to the standby mode. In this case, the power consumption of the remote controller decreases to the standby power.

For convenience of illustration and explanation, the period from the carrier sense start to termination of transmission, and the response reception period are performed in a single time slot period Ts, as an example. In some cases, the amount of the control information to be transmitted or the amount of the response information to be responded may be much, and the above periods may be longer than the single time slot period Ts. In this case, according to the length corresponding to the amount of the control information or the response information, two or more time slot periods Ts may be assigned as the period from the career sense start to the transmission end of the control information.

The remote controller which has determined that the wireless communications in the communication frequency is unavailable shifts to the standby mode, and waits for a random standby time ((d) part of FIG. 5). When a grace period for communication of the contention access period P2 remains after elapse of the standby time, the remote controller shifts to the carrier sense reception mode at the start timing of the following time slot to perform the carrier sense, so that the wireless communication in the communication frequency may be available. When transmission in the contention access period P2 is unavailable, the transmission is carried over to the contention access period P2 of the frame Fr in the following cycle.

Incidentally, the remote controller that does not have the control information to be transmitted does not perform the carrier sense, and shifts from the beacon reception mode to the standby mode (not illustrated).

Figure 6:
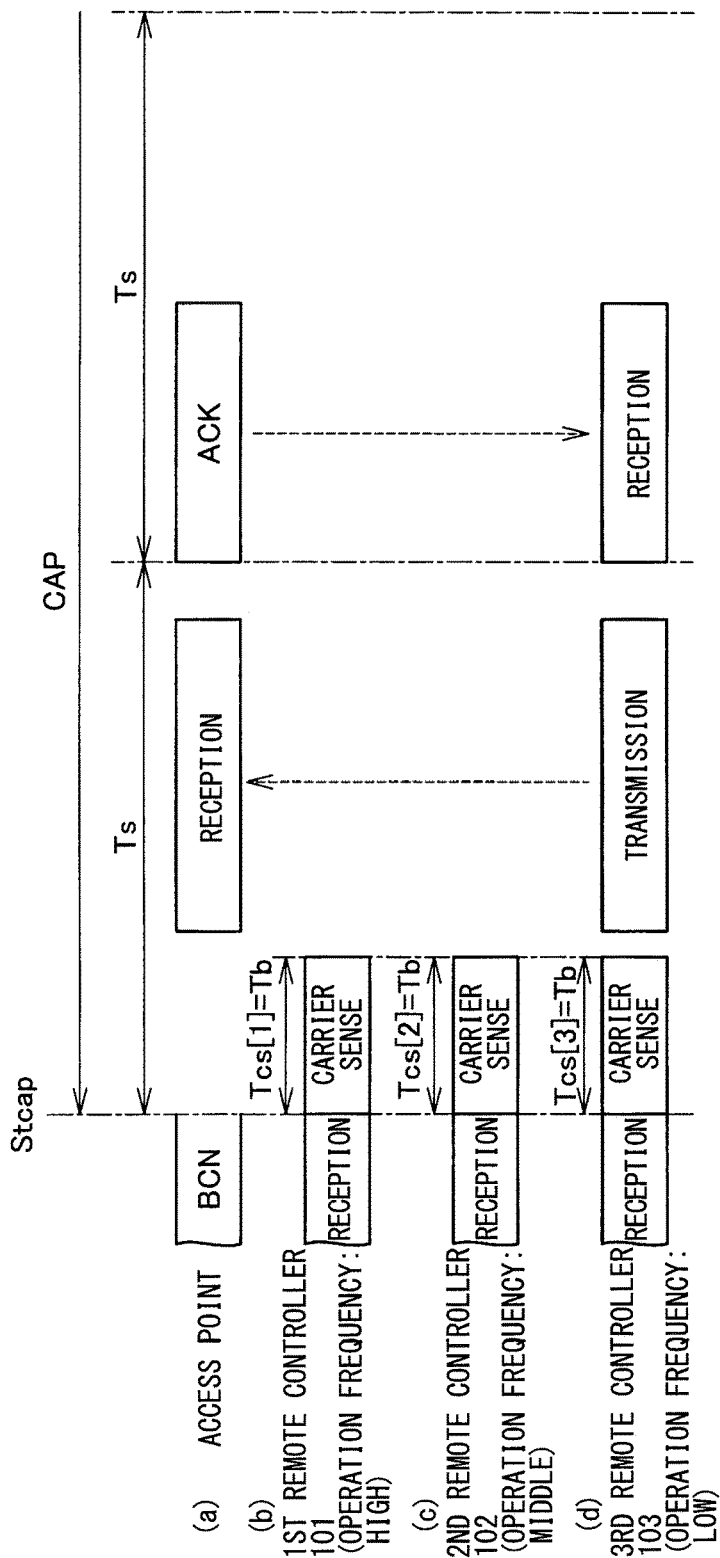
FIG. 6 is a diagram illustrating a comparison example of wireless communication operation in which a remote controller transmits control information in a contention access period.

FIG. 6 is a diagram illustrating a comparison example of the wireless communication operation in which the remote controller transmits the control information in the contention access period P2. FIG. 6 illustrates an example where transmissions of the control information from three remote controllers 101, 102, 103 overlap.

The remote controllers 101, 102, 103 respectively performs the carrier sense in carrier sense periods Tcs [1], Tcs [2], Tcs [3] from the start timing Stcap of the contention access period P2. In the present embodiment, each of the career sense periods Tcs [1], Tcs [2], Tcs [3] has the same length Tb. In this case, a remote controller that can perform communication is undetermined since it is determined by error of termination timing of each of the carrier sense periods Tcs [1], Tcs [2], Tcs [3]. In case of FIG. 6, the communication by the third remote controller 103 is determined as available and the communications by the first remote controller 101 and the second remote controller 102 are determined as unavailable.

The first remote controller 101, which is determined that the communication is unavailable, repeatedly executes the carrier sense until it is determined that the communication is available, in the same contention access period P2 or a contention access period P2 in the following or after frame Fr, so as to transmit the control information. In this case, in accordance with the number of times of execution of the carrier sense, which is repeatedly performed until it is determined that the communication is available, the first remote controller 101 consumes the carrier sense power. Incidentally, although the reception power is smaller than the transmission power, the reception power is much greater than the standby power (as (c) part of FIG. 5). Therefore, when the carrier senses are repeatedly performed due to a determination that the communication is unavailable, the amount of power consumption may accumulate and may cause battery consumption, and decreases a battery life. Therefore, the amount of the power consumption of a remote controller with high operation frequency may increase, and the battery life may shorten. In addition, in accordance with deviation of the operation frequency of the remote controller, the battery lives of the remote controllers may greatly deviate. Therefore, according to the wireless communication system 100 in the first embodiment, as be explained below, the power consumption of a remote controller having high operation frequency is suppressed, so as to suppress the battery consumption. Accordingly, a difference of battery lives of the remote controllers is suppressed.

Figure 7:
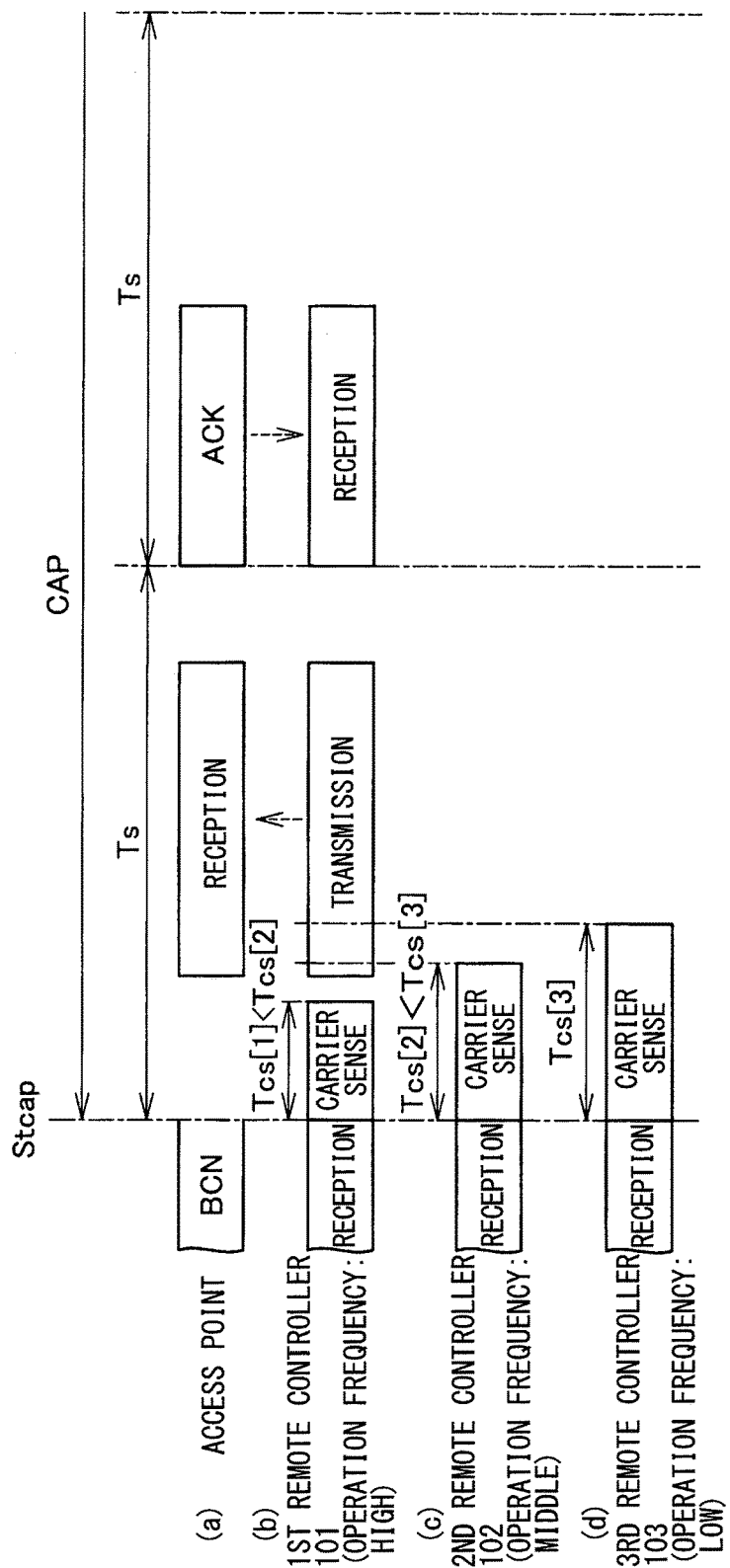
FIG. 7 is a diagram illustrating an example of wireless communication in which a remote controller transmits control information in a contention access period.

FIG. 7 is a diagram explaining an example of the wireless communication operation in which the remote controller transmits the control information in the contention access period P2. FIG. 7 illustrates an example where transmissions of the control information from the three remote controllers 101, 102, 103 overlap. It is supposed that the operation frequencies are different and decrease in the order to the first remote controller 101, the second remote controller 102, and the third remote controller 103. In other words, as an example, the operation frequency of the first remote controller 101 is large. The operation frequency of the second remote controller 102 is middle. The operation frequency of the third remote controller 103 is low.

In this case, the carrier sense period Tcs [3] of the third remote controller 103, the carrier sense period Tcs [2] of the second remote controller 102, and the carrier sense period Tcs [1] of the first remote controller are defined to satisfy the following expression so that a remote controller having a higher operation frequency has a shorter carrier sense period: Tcs [3]>Tcs [2]>Tcs [1]. With this, the first remote controller 101, which has the highest operation frequency, initiates transmission earliest since it is determined that the communication is available earliest. The other remote controllers 102, 103 cannot start transmission since it is determined that the communication is unavailable. After the first remote controller 101, the communication by the second remote controller 102 becomes available, and then, the communication of the third remote controller 103, which has the lowest operation frequency, becomes available. Accordingly, since a communication priority of a remote controller having a higher operation frequency increases, it may be possible to suppress increase of the amount of consumption of the carrier sense power, which occurs by repeating the carrier sense due to a determination that the communication is unavailable. Therefore, it may be possible to suppress the power consumption of a remote controller with high operation frequency, and it may be possible to reduce a difference of battery lives of remote controllers.

For example, a remote controller having a short carrier sense period than other remote controller can obtain more chances to transmit the control information earlier than other remote controller, since check time to confirm whether the communication is available is short. Therefore, in a remote controller with increased operation frequency and increased transmission frequency, the carrier sense period shortens. Thus, in transmission of one control information, a possibility (referred to as a transmission possibility) to achieve transmission in a short carrier sense period increases, and also, it may be possible to suppress the power consumption by the carrier sense in a single communication. By contrast, in a remote controller with a long carrier sense period as compared with other remote controller, a situation reverse to a case where the carrier sense period is short occurs. The power consumption by the carrier sense in a single communication increases. Accordingly, in a remote controller having a high operation frequency and high transmission frequency, the amount of the power consumption is large according to the transmission frequency. In contrast to this, the amount of the power consumption by the carrier sense becomes small. Similarly, a remote controller having a low operation frequency and low transmission frequency, the amount of the power consumption is low according to the transmission frequency. In contrast to this, the amount of the power consumption by the carrier sense becomes large. Therefore, degrees of progress of the electric consumption of the remote controller having the high power consumption and the low power consumption come close to each other. Since a difference of battery consumptions of the remote controllers decreases, it may be possible to be close battery change timing of each of the remote controllers.

A balance battery consumption amount is defined as the battery consumption amount in which the difference of the battery consumption amounts between the remote controllers is equal to zero. Regarding remote controllers each having the high operation frequency and high transmission frequency and the battery consumption amount greater than the balance battery consumption amount, the following adjustment is performed. Since the battery consumption amount of each of the remote controllers is greater than the balance battery consumption amount, an adjustment is performed so as to decrease the power consumption by the carrier sense. Incidentally, since a difference in priorities of communication by the remote controllers is provided in accordance with the transmission frequency (the number of times of transmission), an adjustment is performed so that the power consumption amount by the carrier sense is relatively suppressed in a remote controller having higher priority. By contrast, regarding remote controllers each having the low operation frequency and low transmission frequency and the battery consumption amount less than the balance battery consumption amount, the following adjustment is performed. An adjustment is performed so that the power consumption amount by the carrier sense becomes greater than the power consumption amount by the carrier sense of a remote controller having higher battery consumption amount than the balance battery consumption amount. Incidentally, since a difference in priorities of communication by the remote controllers is provided in accordance with the transmission frequency (the number of times of transmission), an adjustment is performed so that the power consumption amount by the carrier sense relatively increase in a remote controller having lower priority. The number of times of transmission of the control information may also be referred to as a transmission times of the control information.

Therefore, in accordance with the operation frequency of multiple remote controllers, a balance of the power consumption amount by each of the carrier senses is adjusted. It may be possible to decrease a difference of the battery consumption amount of the remote controllers and come close to the battery exchange timing of the remote controllers. Accordingly, it may be possible for a user to make the battery management of the remote controllers easy.

As described below, each of the remote controllers 101, 102, 103 performs the carrier sense using the carrier sense period Tcs, which is notified from the carrier sense management portion 22 (illustrated in FIG. 3) in the access point 10.

Figures 8, 9:
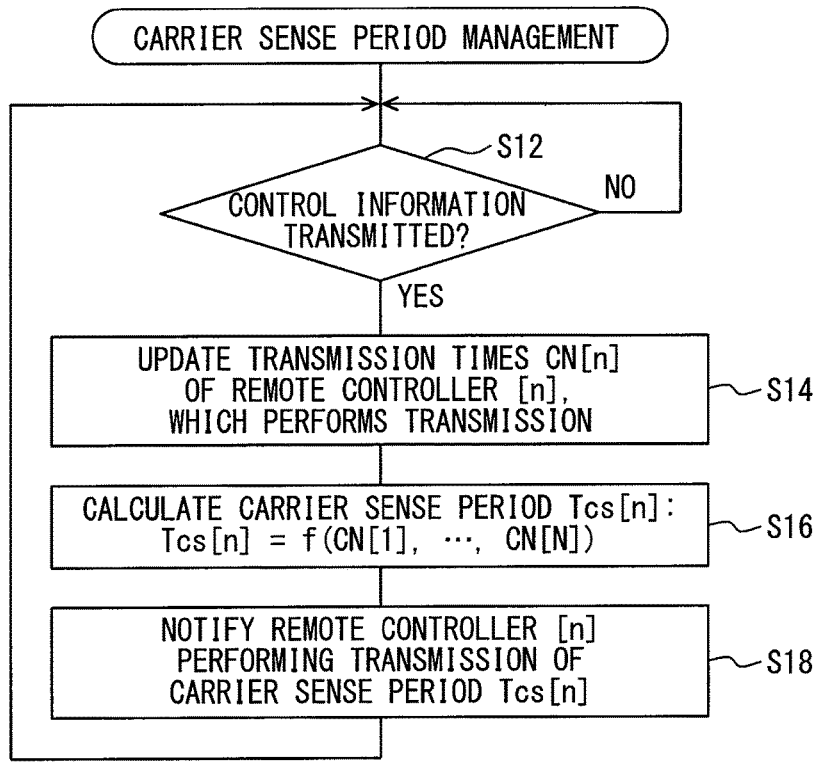
FIG. 8 is a diagram illustrating a procedure of a carrier sense period management performed by a carrier sense management portion of the access point.
FIG. 9 is a diagram illustrating a setting example of the carrier sense period.

FIG. 8 is a diagram illustrating a procedure of the carrier sense period management performed by the carrier sense management portion 22 of the access point 10. The carrier sense period management is repeatedly performed after an operation initiation of the wireless communication system 100. Incidentally, the operation initiation corresponds to a time when an initialization between multiple remote controllers and the access point 10 is performed and the wireless communication is available. Incidentally, the operation termination corresponds to the time of shut down of the access point 10, or the time when the number of a remote controller in which the wireless communication is available decreases or increases. For example, it is supposed that the number of the remote controllers configuring the wireless communication system 100 decreases due to any difficulty or flat battery of a remote controller. In this case, the carrier sense period management is initiated after the initialization between the access point 10 and the multiple remote controllers is performed again, and the wireless communication becomes available. Incidentally, whether the wireless communication is available is checked whether transmission and reception of information periodically performed between each of the remote controllers and the access point 10 at the time of initialization or the time of the contention free period P3. Incidentally, hereinafter, it is supposed that the number of the remote controllers in which the wireless communication is available at the time of the operation initiation of the wireless communication system 100 is set to N (in the present example, N=3). It is supposed that a remote controller of an address n (n=1 to N) is described as a remote controller [n].

The career sense management portion 22 monitors transmission of the control information from any one of the remote controllers at S12. When there is the transmission of the control information, at S14, the number of times of transmission CN [n] of the remote controller [n] with transmission is updated to a value notified with the transmission of the control information. Incidentally, the number of times of transmission of each remote controller corresponds to the number of times of wireless communication transmitting the control information performed in accordance with the operation of the user after the initiation of operation to the present time point. In addition, the number of times of transmission of each remote controller is stored in a memory (not shown) from the initiation of operation.

At S16, in accordance with the following expression 1, the carrier sense period Tcs [n] of the remote controller [n], which has transmitted, is calculated:

$$Tcs[n]=f(CN[1], \ldots, CN[N]) \qquad \text{Expression 1}$$

Here, f (CN [1], . . . , CN [N]) has, as parameters, the number of times of transmission CN [1] to CN [N] of each remote controller, and corresponds to a function. In f (CN [1], . . ., CN [N]), in accordance with a relative relation of the number of times of each remote controller, the carrier sense period is set to shorten for a remote controller with large number of times of transmission. Specifically, for example, as illustrated in the following expression 2, Tcs [n] is set to shorten than an initial value Tb with larger communication ratio K [n]:

$$Tcs[n]=Tb \cdot (1-K[n]) \qquad \text{Expression 2}$$

Incidentally, K [n] is described as follows:

$$K[n]=CN[n]/\Sigma_{k=1}^{N}CN[k]$$

The function is not limited to the above relation. Any function in which the carrier sense period is set to shorten for a remote controller with large number of times of transmission can be used.

FIG. 9 is a diagram illustrating a setting example of the carrier sense period. In the following example, it is supposed that the number of times of transmission CN [1] of the remote controller [1], the number of times of transmission CN [2] of the remote controller [2], and the number of times of transmission CN [3] of the remote controller [3] respectively is equal to ten, five, and one, as relative values. In this case, in the remote controller [1], the communication ratio K [1] corresponds to 10/16, and the carrier sense period Tcs [1] corresponds to 6/16 Tb. In the remote controller [2], the communication ratio K [2] corresponds to 5/16, and the carrier sense period Tcs [2] corresponds to 11/16 Tb. In the remote controller [3], the communication ratio K [3] corresponds to 1/16, and the carrier sense period Tcs [3] corresponds to 15/16 Tb. Accordingly, it may be possible to set the carrier sense period Tcs to shorten for a remote controller with greater number of times of transmission and larger communication ratio.

At S18 in FIG. 8, to a remote controller [n] that has transmitted the control information, the carrier sense management portion 22 notifies the calculated carrier sense period Tcs [n]. The notified carrier sense period Tcs [n] is used as the length of a period of a carrier sense performed before transmission of the next control information. The notification of the carrier sense period is transmitted, the response signal from the access point 10 including the notification of the carrier sense period. By contrast, a beacon signal in the next time may include the notification of the carrier sense period, and the notification of the carrier sense period may be transmitted in this manner.

As explained above, in the first embodiment, the carrier sense period shortens and a possibility of communication increases with higher communication priority for a remote controller with high operation frequency and large power consumption. Thus, it may be possible to suppress the power consumption by the carrier sense before transmission of the control information is performed, and to suppress the battery consumption. Incidentally, the higher operation frequency corresponds to a greater number of times of wireless transmission the control information in accordance with the operation by the user. Accordingly, it may be possible to suppress the difference of battery lives of each remote controller. It may be possible to make the battery management of the remote controllers by the user easy.

Figure 10:
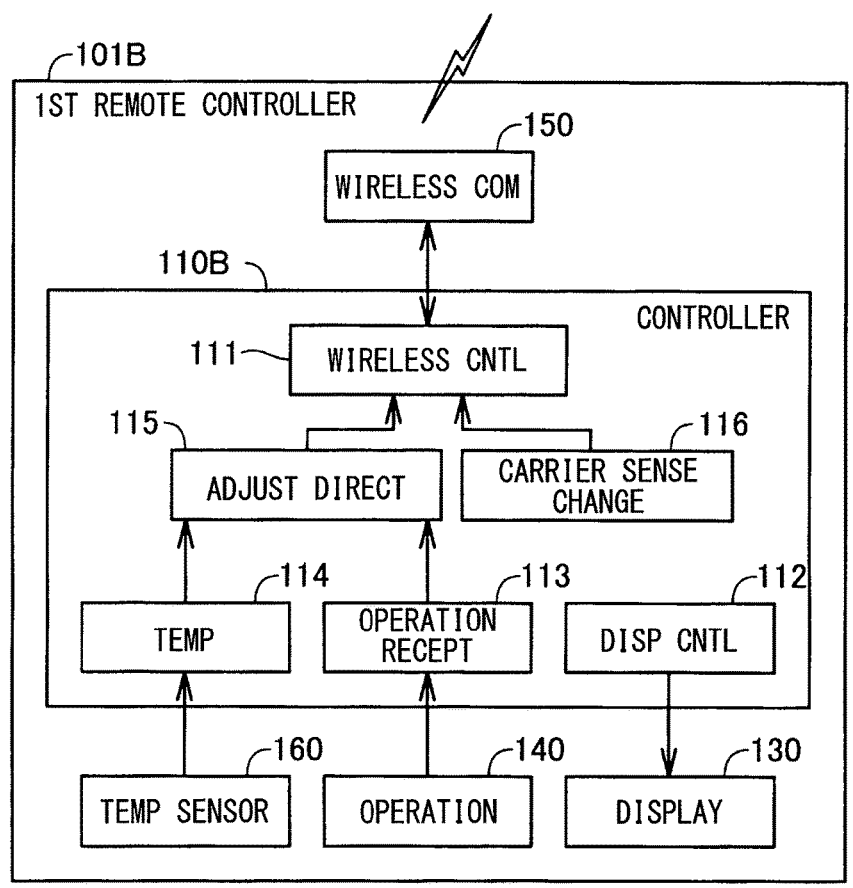
FIG. 10 is a block diagram illustrating a configuration of a first remote controller in a second embodiment.

FIG. 10 is a block diagram illustrating a configuration of a first remote controller 101B in a second embodiment. The remote controller 101B has a control portion 110B that includes a carrier sense change portion 116 in addition to a configuration of the control portion 110 of the remote controller 101 in the first embodiment. Incidentally, the other remote controller has the same configuration as the remote controller 101B.

In the first embodiment, each of the remote controllers 101, 102, 103 performs the carrier sense using the carrier sense period Tcs, which is calculated by the carrier sense management portion 22 of the access point 10. By contrast, in the second embodiment, each remote controller calculates a carrier sense period Tcs by its carrier sense change portion 116 and performs the carrier sense irrelevantly to the number of times of transmission of other remote controllers, without receiving the carrier sense period from the access point in each time as described in the first embodiment.

Figure 11:
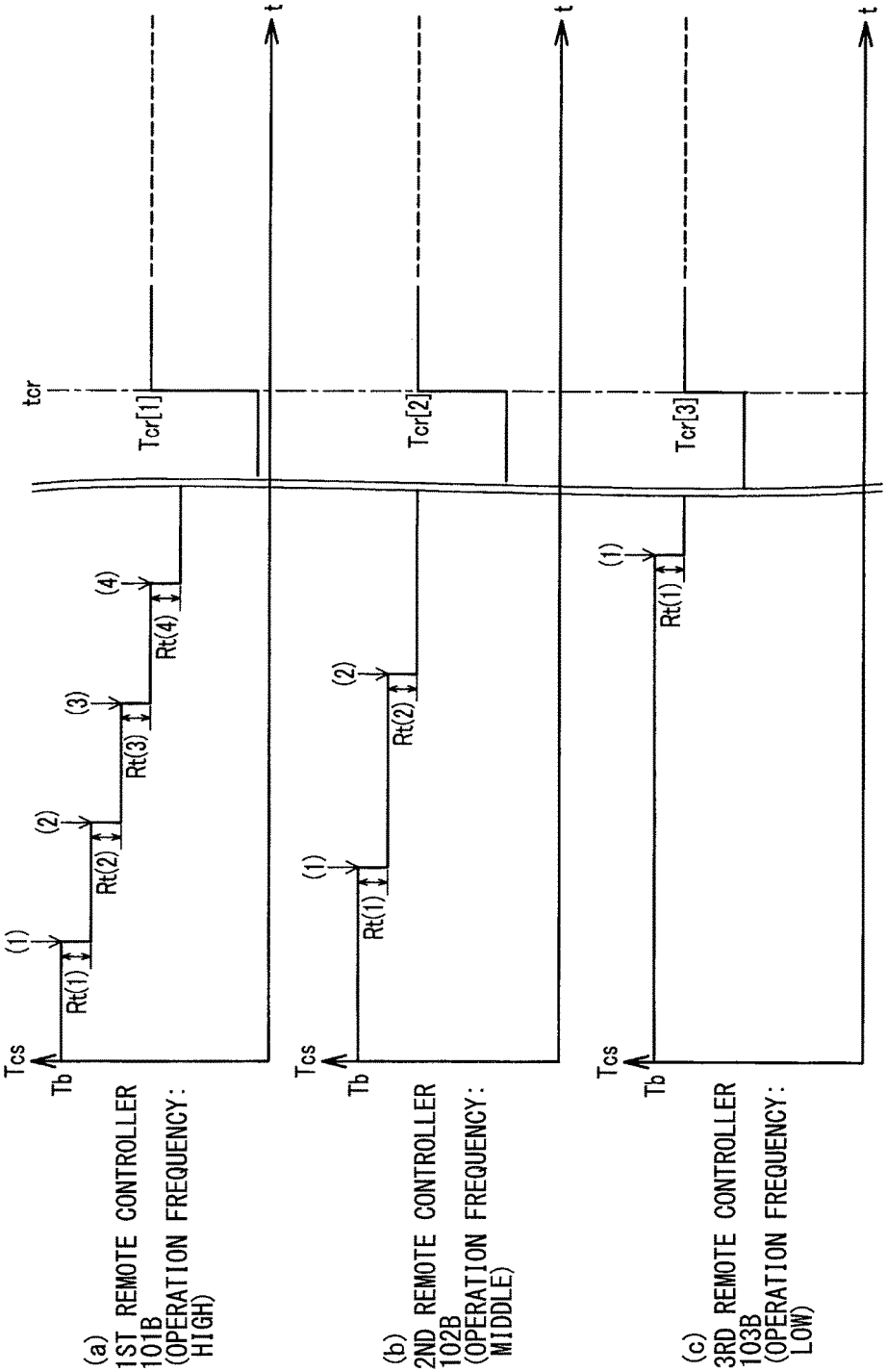
FIG. 11 is a diagram illustrating an example of a chronological change of the carrier sense period performed by a carrier sense change portion of each remote controller.

FIG. 11 is a diagram illustrating an example of a chronological change of the carrier sense period Tcs performed by the carrier sense change portion 116 of each remote controller. It is supposed that the operation frequencies decrease in the order of the first remote controller 101B, the second remote controller 102B, and the third remote controller 103B. In other words, as an example, the operation frequency of the first remote controller 101B is large. The operation frequency of the second remote controller 102B is middle. The operation frequency of the third remote controller 103B is low. FIG. 11 illustrates a case where each carrier sense period Tcs changes. An arrow in FIG. 11 describes a position of transmission of the control information according to the operation. The bracketed number above the arrow illustrates the number of times of transmission CN of the control information.

The carrier sense change portion 116 in each of the remote controllers 101B, 102B, 103B calculates a reduction time Rt (CN) in accordance with the number of times of transmission, and shortens the carrier sense period Tcs. Each of the remote controllers independently performs the above process. Accordingly, as exemplified in FIG. 11, in each remote controller, the reduction time Rt(CN) in accordance with the number of times of transmission CN of itself is the same value in all remote controllers. As illustrated in FIG. 11, a carrier sense period Tcs of a remote controller with high operation frequency shortens. The carrier sense change portion 116 of each of the remote controllers 101B, 102B, 103B may calibrate the carrier sense period Tcs with a calibration value Tcr (Tcr [1], Tcr [2], Tcr [3]) in accordance with the operation frequency by using calibration information transmitted from the access point 10. The access point 10 monitors the carrier sense period Tcs of each of the remote controllers 101B, 102B, 103B. The access point 10 transmits the calibration information at a calibration timing tcr, when a predetermined calibration condition is satisfied.

Figure 12:
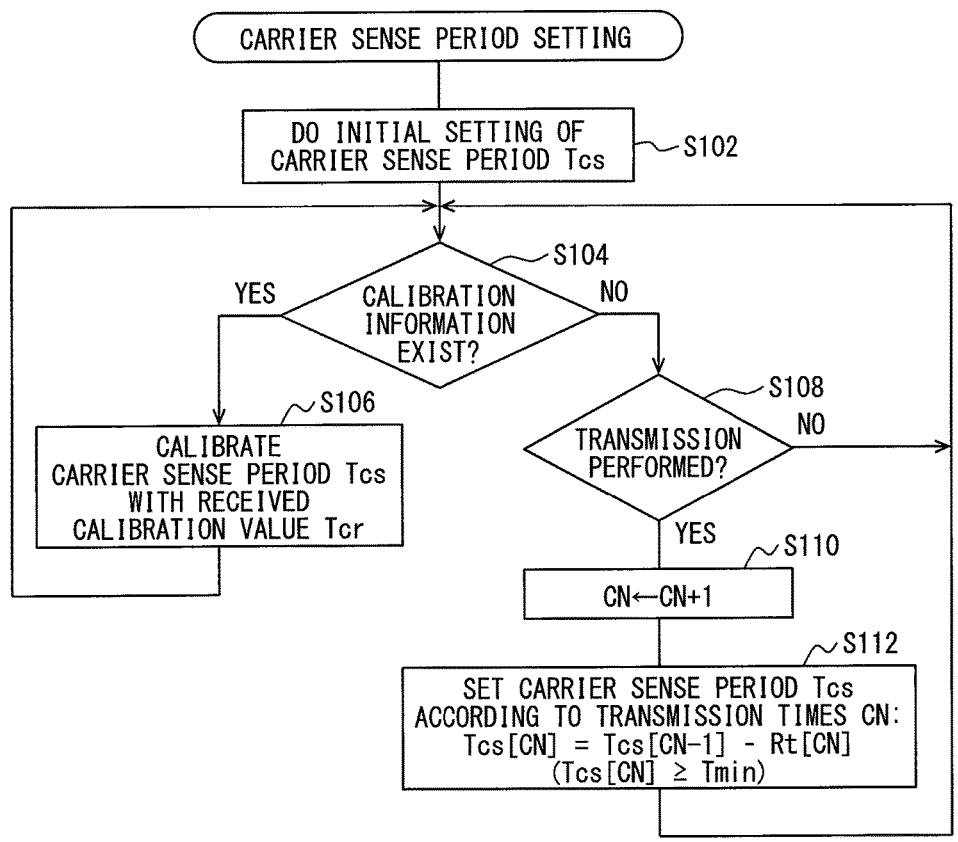
FIG. 12 is a diagram illustrating a procedure of the carrier sense period setting performed by the carrier sense change portion.

FIG. 12 is a diagram illustrating a procedure of the carrier sense period setting performed by the carrier sense change portion 116. The carrier sense period setting is repeatedly performed after initiation of the operation.

The carrier sense change portion 116 sets the carrier sense period Tcs to an initial value Tb at S102. At S104, the carrier sense change portion 116 monitors whether the access point 10 has transmitted the beacon signal including the calibration information. When the calibration information exists, the carrier sense period Tcs is calibrated with the calibration value Tcr determined by the received calibration information at S106, and the process returns to S104. An example of calibration process will be explained later. By contrast, when the calibration information does not exist, it is monitored at S108 whether the control information is transmitted. When the control information is not transmitted, the process returns to S104. By contrast, when the control information is transmitted, the process shifts to S110. At S110, the number of times of transmission increases by one. At S112, in accordance with the number of times of transmission CN, the carrier sense period Tcs [CN] calculated from the following expression 3 is set as the next carrier sense period, and the process returns to S104. When a value calculated from the expression 3 is less than a minimum value Tmin, the carrier sense period Tcs [CN] is set to the minimum value Tmin.

$$Tcs[CN]=Tcs[CN1]-Rt[CN] \quad \text{Expression 3}$$

Herein, Rt [CN] is a reduction time in accordance with the number of times of transmission CN.

Figure 13:
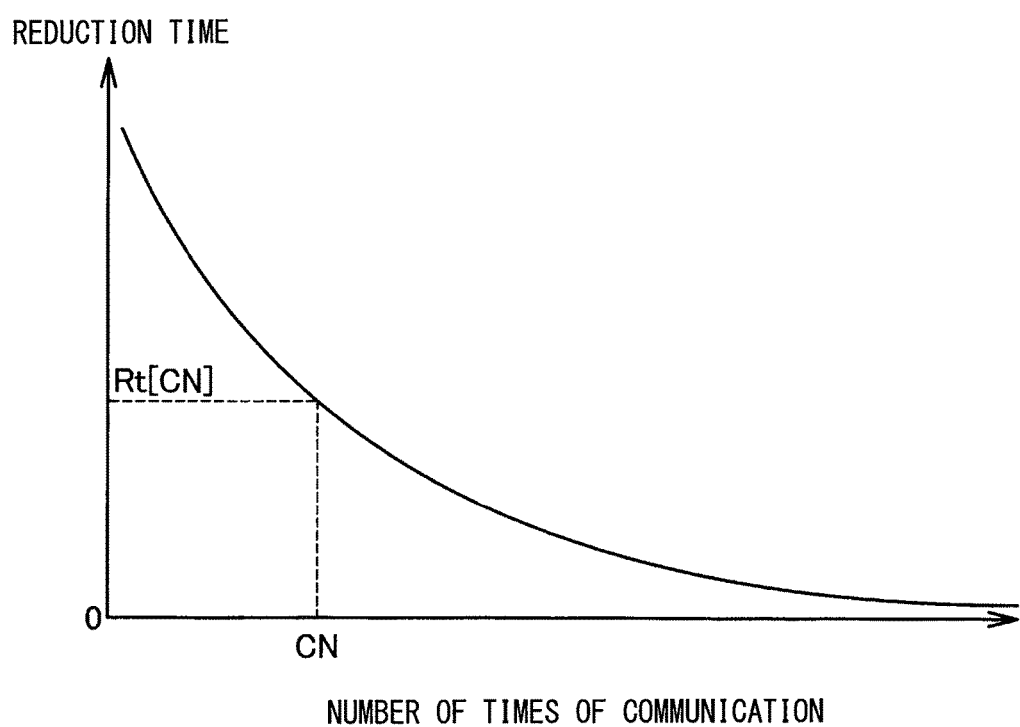
FIG. 13 is a diagram illustrating an example of relation between the number of times of transmission and a reduction time.

FIG. 13 is a diagram illustrating an example of relation between the number of times of transmission CN and a reduction time Rt [CN]. FIG. 13 illustrates an example of the reduction time Rt [CN], which decreases in accordance with increase of the number of times of transmission CN. The relation between the number of times of transmission CN and the reduction time Rt [CN] is stored in a memory (not shown) of each of the remote controllers 101B, 102B, 103B in advance. The carrier sense change portion 116 calculates the reduction time Rt [CN] corresponding to the number of times of transmission CN, based on the relation between the number of times of transmission CN and the reduction time Rt [CN], and calculates the carrier sense period Tcs [CN] based on the expression 3. The above described relation between the number of times of transmission CN and the reduction time Rt [CN] is an example. Any relation which can shorten the carrier sense period Tcs in accordance with the increase of the number of times of transmission may be used in order to calculate the carrier sense period.

FIG. 14 is a diagram illustrating an example of calibration of a carrier sense period Tcs. Herein, a relation between the number of times of transmission CN [n] and the carrier sense period Tcs [n] corresponding to an address n (n=1, 2, 3) of the three remote controllers 101B, 102B, 103B. The carrier sense period Tcs [n] of each remote controller decreases according to increase of the number of times of transmission CN [n] of itself. Therefore, even when the numbers of times of transmission CN [n] are different, the difference between the carrier sense periods of the remote controllers may decrease. An effect of improvement of a transmission possibility of a remote controller with high operation frequency may decrease.

The upper part of FIG. 14 illustrates an example where a difference ΔTcs between a remote controller with the most number of times of transmission CN [n] (corresponding to the first remote controller 101B in the example) and another remote controller with the least number of times of transmission CN [n] (corresponding to the third remote controller 103B in the example) is equal to or less than a predetermined threshold Tcsh.

When the following two calibration conditions are satisfied, it may be preferable that the carrier sense period Tcs of each remote controller is calibrated.

A first calibration condition: the minimum number of times of transmission CN is equal to or greater than a predetermined number of times of calibration CNh.

A second calibration condition: the maximum difference ΔTcs between the carrier sense periods is equal to or less than a calibration time difference Tcsh.

The present disclosure is not limited to a case where the above calibration conditions are satisfied. For example, the calibration may be performed when the first calibration condition is satisfied. Alternatively, the calibration may be performed when a predetermined time is exceeded. The calibration condition is not limited to the present disclosure as long as the calibration is performed before the operation frequency of the remote controller enlarge, and the difference between the carrier sense periods of the remote controller decreases, and the effect to improve the transmission possibility of a remote controller with high operation frequency decreases.

The lower part of FIG. 14 illustrate an example where, while keeping the relation of the difference between the number of times of transmission CN [1], CN [2], CN [3] before calibration of each of the remote controllers 101B, 102B, 103B, the number of times of transmission CNc [1], CNc [2], CNc [3] are determined so that the maximum difference ΔTcs of the carrier sense period Tcs of each of the remote controllers 101B, 102B, 103B becomes greater than the calibration time difference Tcsh, and the corresponding calibration values Tcr [1], Tcr [2], Tcr [3] is determined as the carrier sense period Tcs.

As described above, when the calibration condition is satisfied, and when the carrier sense period Tcs of each remote controller is calibrated, it may be possible to prevent decrease of the effect to improve the transmission possibility while improving the transmission priority of a remote controller with high operation frequency.

Incidentally, the calibration information may be transmitted included in the beacon signal from the carrier management portion 22 (as illustrated in FIG. 3) of the access point 10 when the calibration condition is satisfied. The carrier sense change portion 116 of each remote controller can calculate the reduction time Rt [CN] corresponding to the number of times of transmission CN by considering the number of times of transmission CNc after calibration, which is included in the calibration information, as the initial number of times of transmission after calibration. The carrier sense change portion 116 can calculate the carrier sense period based on the expression 3 by considering the calibration value Tcr as the initial value after calibration.

Incidentally, the calibration process is not limited to this example. Any calibration method can be used as long as the magnitude relation of the number of times of transmission and the carrier sense period of each remote controller remains and the calibration is performed so as to make the difference of the carrier sense period enlarge. As explained in the first embodiment, when the calibration condition is satisfied, the access point may calculate the carrier sense period having the length corresponding to a relative relation of the number of times of transmission of each remote controller, and may transmit the carrier sense period to be included in the calibration information as the initial value after calibration to each remote controller. That is, the calibration method is not limited to the present disclosure as long as the carrier sense period is calibrated to a proper carrier sense period corresponding to the number of times of transmission of each remote controller. Incidentally, the calibration may be unnecessary, and may be omitted.

Also in the second embodiment, the carrier sense period shortens and the communication possibility increases with high communication priority for a remote controller with high operation frequency and large power consumption. Thus, it may be possible to suppress the power consumption by wireless communication, especially, power consumption by the carrier sense performed before the control information is transmitted, and may be possible to suppress the battery consumption. Incidentally, the operation frequency corresponds to the number of times of transmission of the control information executed in accordance with the operation by the user. Accordingly, it may be possible to suppress the difference of the battery lives of each remote controller.

It may be possible for each remote controller to quickly change the carrier sense period in accordance with increase of the number of times of transmission of its control information regardless of other remote controller, without receiving the carrier sense period from the access point in each time as described in the first embodiment. And, only when the calibration condition is satisfied, the access point transmits the calibration information to each remote controller. With this, it may be possible to adjust the carrier sense period of each remote controller to a proper state in accordance with a priority of communication. Accordingly, it may be possible to adjust the carrier sense period in accordance with the priority of the communication of each remote controller quickly and easily. It may be possible to easily adjust the carrier sense period in accordance with the priority of the communication of each remote controller properly.

(Modification)

Incidentally, the present disclosure is not limited to the described embodiments and examples, and can be performed in various modes within a scope of the disclosure. For example, the present disclosure can be achieved as follows.

In the above embodiments, the control system is applied to the air conditioning system. The present disclosure is not limited to the air conditioning system. The wireless communication and the wireless communication method can be applied to any system having a control target that providing each service to multiple fields.

The present disclosure is not limited to the above mentioned embodiments and the above mentioned modifications, and can be achieved by various configurations within a scope of the disclosure. For example, embodiments corresponding to a technical feature in each embodiment and a technical feature in the modification can be appropriately combined and exchanged in order to partially or fully solve the difficulty or in order to partially or fully attain the effects.

In the wireless communication system, the consumption power of the remote controller may be a reception power higher than the standby power in the reception period of the beacon signal, may be a carrier sense power higher than the standby power in the carrier sense period, may be a transmission power higher than the carrier sense power in the transmission period of the control information to the access point, may be a reception power lower than the transmission power and higher than the standby power in the response period from the access point, and may be the standby power after the response period.

According to the wireless communication system, it may be possible to prevent the carrier sense power consumed in the carrier sense period from occurring, and to decrease the battery consumption, and to prevent decrease of the battery lives.

In the wireless communication system, the access point may have a carrier sense management portion that manages the carrier sense period of each remote controller. The carrier sense management portion may calculate the carrier sense period having the length corresponding to a relative relation of the number of times of transmission of the control information of each remote controller after a remote controller transmits the control information. The carrier sense management portion may transmit the calculated carrier sense period to the remote controller through the access point side wireless communication control portion.

According to the wireless communication system, after the remote controller transmits the control information, the carrier sense management portion of the access point calculates the carrier sense period having the length of which shortens corresponding to the relative relation of the number of times of transmission of the control information of each remote controller. The remote controller receives the calculated carrier sense period, and can perform the carrier sense during the received carrier sense period at the time of transmission of the next control information. The carrier sense period calculated by the carrier sense management portion is set to the length corresponding to the relative relation of the number of times of transmission of the control information of each remote controller. Thus, the calculated carrier sense period is set to be shortened for a remote controller with high operation frequency and large power consumption. Therefore, it may be possible to improve a transmission possibility for the remote controller with high operation frequency and large power consumption. That is, it may be possible to improve a priority of communication in accordance with the relative relation of the number of times of transmission for a remote controller with high operation frequency and high transmission frequency. Accordingly, it may be possible to suppress the power consumption for a remote controller with high operation frequency and large power consumption. Thus, it may be possible to suppress the difference of the battery lives of the remote controllers. Therefore, it may be possible to control a balance of the power consumption of each remote controller. Accordingly, it may be possible for a user to make the battery management of each remote controller easy.

The remote controller of the wireless communication system may have a carrier sense change portion that changes the carrier sense period. The carrier sense change portion may change to shorten the carrier sense period in accordance with increase of the number of times of transmission of the control information of its remote controller regardless of the number of times of transmission of the control information in other remote controller, after transmitting the control information. According to the wireless communication system, the remote controller, after transmission of the control information, can easily change to shorten the carrier sense period in accordance with increase of the number of times of transmission of its control information regardless of other remote controller. In addition, regardless of other remote controller, the remote controller can quickly change the carrier sense period in accordance with increase of the number of times of transmission of its control information. With this, regardless of the access point, the carrier sense period of the remote controller with high operation frequency and large power consumption shortens. Therefore, it may be possible to easily improve the priority of communication of the remote controller. Thus, it may be possible to easily adjust the priority of communication according to the operation frequency of each remote controller. Accordingly, it may be possible to suppress the power consumption for a remote controller with high operation frequency and large power consumption. Thus, it may be possible to suppress the difference of the battery lives of each remote controller. Therefore, it may be possible to control a balance of the power consumption of each remote controller. Accordingly, it may be possible for a user to make the battery management of each remote controller easy.

In the wireless communication system, the access point may have a carrier sense management portion that manages the carrier sense period of each remote controller. The carrier sense management portion may monitor the carrier sense period of each remote controller changing in accordance with increase of the number of times of transmission of the control information from each remote controller based on the number of times of transmission of the control information from each remote controller. When a predetermined calibration condition is satisfied, the carrier sense management portion may transmit calibration information of the carrier sense period corresponding to each remote controller to each remote controller through the access point side wireless communication control portion.

According to the wireless communication system, each remote controller independently and quickly change the carrier sense period in accordance with the number of times of transmission of the control information regardless of the access point. Thus, it may be possible to improve the priority of communication in accordance with the operation frequency of each remote controller for a remote controller with high operation frequency and large power consumption. Only when the calibration condition is satisfied, the carrier sense period is calibrated by the calibration information transmitted from the access point. Therefore, it may be possible to perform a proper adjustment of the priority of the communication in accordance with the operation frequency of each remote controller.

In the wireless communication system, the control target may be an air conditioning apparatus.

According to this configuration, in multiple remote controllers for controlling multiple air conditioning apparatus providing air conditioning, it may be possible to suppress the power consumption of a remote controller with high operation frequency, and it may be possible to reduce a difference of battery lives of each remote controller.

Incidentally, the present disclosure can be achieved by various modes. For example, the present disclosure can be achieved by an air conditioning apparatus, a remote controller, an access point, a wireless communication system, a wireless communication method, a computer program controlling a remote controller, and a computer program controlling an access point.

It is noted that a flowchart or the process of the flowchart in the present application includes steps (also referred to as sections), each of which is represented, for instance, as S12. Further, each step can be divided into several sub-steps while several steps can be combined into a single step.

While the embodiments, the configurations, the aspects of a wireless communication system and a wireless communication method have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A wireless communication system performing wireless communication in carrier sense multiple access/collision avoidance system, the wireless communication system comprising:
   a plurality of remote controllers that corresponding to a plurality of control targets and transmitting control information for controlling each of the control targets through wireless communication, each of the remote controllers having a battery as power source; and
   an access point that receives and relays the control information to a control apparatus of the control target, wherein:
   the access point includes an access point side wireless communication control portion transmitting a beacon signal at a particular cycle and performing wireless communication with each of the remote controllers, the beacon signal having communication condition information;
   each of the remote controllers includes a remote controller side wireless communication control portion performing wireless communication with the access point in accordance with the communication condition information, which is included in the beacon signal received;
   the remote controller side wireless communication control portion performs a carrier sense for a predetermined carrier sense period after receiving the beacon signal; and
   when determining that transmission of the control information by one of the remote controllers is available by the carrier sense, the remote controller side wireless communication control portion transmits the control information, and the remote controller side wireless communication control portion shortens the carrier sense period for a next carrier sense in accordance with number of times of transmission of the control information.

2. The wireless communication system according to claim 1, wherein:
   a power consumption of each of the remote controllers is set to:
     a reception power that is greater than a standby power in a reception period of the beacon signal;
     a carrier sense power that is greater than the standby power in the carrier sense period;
     a transmission power that is greater than the carrier sense power in a transmission period of the control information to the access point;
     a reception power that is less than the transmission power and greater than the standby power in a response period from the access point; and
     the standby power after the response period.

3. The wireless communication system according to claim 1, wherein:
   the access point includes a carrier sense management portion that manages the carrier sense period of each of the remote controllers;
   the carrier sense management portion calculates, after transmission of the control information from the one of the remote controllers, the carrier sense period with a length corresponding to a relative relation of numbers of times of transmission of the control information by each of the remote controllers; and
   the carrier sense management portion transmits the carrier sense period calculated to the one of the remote controllers through the access point side wireless communication control portion.

4. The wireless communication system according to claim 1, wherein:
   each of the remote controllers includes a carrier sense change portion that changing the carrier sense period;
   the carrier sense change portion changes, after transmission of the control information, to shorten the carrier sense period in accordance with increase of number of times of transmission of the control information of its remote controller regardless of number of times of transmission of the control information by other remote controller.

5. The wireless communication system according to claim 4, wherein:
   the access point includes a carrier sense management portion that manages the carrier sense period of each of the remote controllers;
   the carrier sense management portion:
     monitors the carrier sense period of each of the remote controllers based on the number of times of transmission of the control information from each of the remote controllers, the carrier sense period changing in accordance with increase of the number of times of transmission of the control information from each of the remote controllers; and
     transmits, when a predetermined calibration condition is satisfied, calibration information of the carrier sense period of each of the remote controllers to each of the remote controllers through the access point side wireless communication control portion.

6. The wireless communication system according to claim 1, wherein:
   the control targets are provided by air conditioning apparatus.

7. A wireless communication method performing wireless communication in carrier sense multiple access/collision avoidance system between a plurality of remote controllers and an access points, the plurality of remote controllers corresponding to a plurality of control targets and transmitting control information for controlling each of the control targets through wireless communication, each of the remote controllers having a battery as power source, the access point receiving and relaying the control information to a control apparatus of the control target, the wireless communication method comprising:
   performing in the access point, by transmitting a beacon signal at a particular cycle, wireless communication with each of the remote controllers, the beacon signal having communication condition information; and
   performing wireless communication with the access point in accordance with the communication condition information, which is included in the beacon signal received,
   wherein:

the performing the wireless communication with the access point includes:
   performing a carrier sense for a predetermined carrier sense period after receiving the beacon signal; and
   shortening, when determining that transmission is available by the carrier sense, after transmitting the control information, the carrier sense period for a next carrier sense in accordance with number of times of transmission of the control information.

\* \* \* \* \*